US005767506A

United States Patent [19]

Bell

[11] Patent Number: 5,767,506

[45] Date of Patent: Jun. 16, 1998

[54] OPTICAL COIN SENSING STATION HAVING A PASSAGEWAY AND BEAM SPLITTERS

[75] Inventor: Michael Bell, Leeds, Great Britain

[73] Assignee: Coin Controls Ltd., Lancashire, United Kingdom

[21] Appl. No.: 809,857

[22] PCT Filed: Aug. 30, 1995

[86] PCT No.: PCT/GB95/02043

§ 371 Date: May 20, 1997

§ 102(e) Date: May 20, 1997

[87] PCT Pub. No.: WO96/10809

PCT Pub. Date: Apr. 11, 1996

[30] Foreign Application Priority Data

Oct. 3, 1994 [GB] United Kingdom ........ 9419912

[51] Int. Cl.$^{6}$ ........ G01V 9/04

[52] U.S. Cl. ........ 250/221; 250/222.1; 194/318

[58] Field of Search ........ 250/221, 222.1, 250/223 R, 559.4; 194/318, 334, 335, 344; 73/163

[56] References Cited

U.S. PATENT DOCUMENTS

| | | | |
|---|---|---|---|
| 4,538,719 | 9/1985 | Gray et al. | 194/100 |
| 4,601,380 | 7/1986 | Dean et al. | 194/318 |
| 4,686,365 | 8/1987 | Meek et al. | 250/281 |
| 4,749,074 | 6/1988 | Ueui et al. | 194/317 |
| 4,754,862 | 7/1988 | Rawicz-Szczerbo et al. | 194/319 |
| 4,845,994 | 7/1989 | Quinlan, Jr. | 73/163 |
| 4,951,800 | 8/1990 | Yoshihara et al. | 194/317 |
| 4,995,497 | 2/1991 | Kai et al. | 194/318 |
| 5,007,520 | 4/1991 | Harris et al. | 194/317 |
| 5,033,603 | 7/1991 | Kai et al. | 194/334 |
| 5,062,518 | 11/1991 | Chitty et al. | 194/317 |
| 5,085,309 | 2/1992 | Adamson et al. | 194/317 |
| 5,155,960 | 10/1992 | Shaanan | 52/884 |
| 5,158,166 | 10/1992 | Barson | 194/319 |
| 5,180,046 | 1/1993 | Hutton et al. | 194/319 |
| 5,226,520 | 7/1993 | Parker | 194/317 |
| 5,379,876 | 1/1995 | Hutton | 194/319 |
| 5,460,256 | 10/1995 | Levasseur | 250/223 R |
| 5,469,952 | 11/1995 | Kershaw et al. | 194/317 |
| 5,489,015 | 2/1996 | Wood | 194/318 |
| 5,515,960 | 5/1996 | Wood | 194/328 |
| 5,657,847 | 8/1997 | Tod et al. | 194/207 |

FOREIGN PATENT DOCUMENTS

| | | |
|---|---|---|
| 0 155 126 A2 | 9/1985 | European Pat. Off. . |
| 0 164 110 A3 | 12/1985 | European Pat. Off. . |
| 0 384 375 A1 | 8/1990 | European Pat. Off. . |
| 0 404 432 A2 | 12/1990 | European Pat. Off. . |
| 2 094 008 | 9/1982 | United Kingdom . |
| 2 169 429 | 7/1986 | United Kingdom . |
| 2 200 778 | 8/1988 | United Kingdom . |
| 2 238 152 | 5/1991 | United Kingdom . |
| WO 85 04037 | 9/1985 | WIPO . |

*Primary Examiner*—Que Le
*Attorney, Agent, or Firm*—Morgan & Finnegan, L.L.P.

[57] ABSTRACT

In a coin sensing station, coins pass edgewise along a passageway through a transparent block and interrupt three optical sensing beams that transverse the passageway at spaced locations. The beams are produced by light emitting diodes which direct light into the block where it is directed by reflection from inclined surfaces integrally molded into the block. By use of a beam splitting means, it is possible to direct the first and second sensing beams from a single source beam, across the passageway at different, spaced apart locations.

17 Claims, 3 Drawing Sheets

OPTICAL COIN SENSING STATION HAVING A PASSAGEWAY AND BEAM SPLITTERS

FIELD OF THE INVENTION

This invention relates to an optical coin sensing station and has particular but not exclusive application to sensing coins leaving the outlet port of a coin hopper.

BACKGROUND

Optical coin sensors have been used for coin hoppers and coin validators in order to detect the presence of coins travelling along a coin passageway. Conventionally, an optical source such as a light emitting diode (LED) directs a beam of light across the coin passageway to a photosensor such as a photodiode. Interruption of the beam by a coin travelling along the passageway is detected by sensor circuitry connected to the photodiode, so as to indicate the presence of a coin. In many situations, coins of different diameters travel along the same passageway and a single source-detector pair will not necessarily detect all coin diameters reliably. Additionally, problems arise with coins that contain holes, which give rise to spurious results from conventional detectors. In order to overcome these problems, hitherto, it has been proposed to use more than one source-detector pair spaced apart across the width of the passageway. However, this increases the component count for the sensor and adds to its expense.

In EP-A-0 017 428 (Mars Inc) there is described an optical sensor in which a beam from a source is arranged to cross a coin passageway on a first occurrence and is the reflected back to a sensor, on the same side of the passageway as the source. Thus, the beam crosses the passageway at two spaced apart locations, which increases reliability of detection for coins of different diameter. However, with this arrangement, significant problems remain. For example, the beam crossings for the passageway need to be arranged in pairs which does not necessarily conveniently fit the geometrical arrangement of the coin hopper or coin validator. In some situations, the most efficient detecting arrangement includes an odd number of sensing locations across the width of the channel; this cannot be achieved by means of the prior art configuration of EP-A-0 017 428. Furthermore, the optical source needs to be directly facing the major surfaces of the coin whereas, in practice, there may not be sufficient room in the coin hopper or validator to accommodate this configuration.

SUMMARY OF THE INVENTION

The present invention provides a solution to these problems. In accordance with the invention, there is provided an optical coin sensing station comprising means defining a passageway along which coins can pass edgewise, a source for providing a source beam of optical radiation, beam splitting means for providing first and second sensing beams from the source beam, means for directing the sensing beams to traverse the passageway at spaced apart locations, first and second sensor means for respectively detecting the first and second sensing beams after having traversed the passageway, whereby the passage of at least one of the sensing beams to its respective sensor means is interrupted by the major surfaces of a coin passing along the passageway, and means responsive to outputs from the sensor means to detect the presence of a coin.

Thus, in accordance with the invention, by the use of a beam splitting means, it is possible to direct the first and second sensing beams from a single source beam, across the passageway at different, spaced apart locations.

In a preferred embodiment, a second source is provided with a second beam splitting means, and a third sensor is provided spaced from the first and second sensors. The second beam splitting means forms third and fourth sensing beams, the third sensing beam being directed to the third sensor, whereas the fourth sensing beam is directed to the second sensor. All three sensors may receive light of substantially similar intensity levels.

The output means conveniently comprises an OR circuit so that an indication of the presence of a coin in the passageway is provided when any one of the sensing beams is interrupted.

The sensing station conveniently is formed in a housing formed of optically transparent material, the passageway including a slot in the housing through which the coins pass edgewise. Receptacles can be formed in the housing to receive the optical sources and the source beams may be directed through the material of the housing. The source beams can be reflected by total internal reflection by means of specially configured surfaces on the housing. The beam splitting means may conveniently comprise angled surfaces formed integrally in the housing.

By means of the invention, the or each said source can be disposed to one side of the passageway, with the source beam being directed exteriorly of the passageway in the direction of its width dimension. As a result, the arrangement can be much more compact than the aforementioned prior art configurations whilst still being able to detect coins of different diameter travelling along the passageway.

BRIEF DESCRIPTION OF THE DRAWINGS

In order that the invention may be more fully understood an embodiment thereof will now be described by way of illustrative example with reference to the accompanying drawings in which.

DETAILED DESCRIPTION

Figure 1:
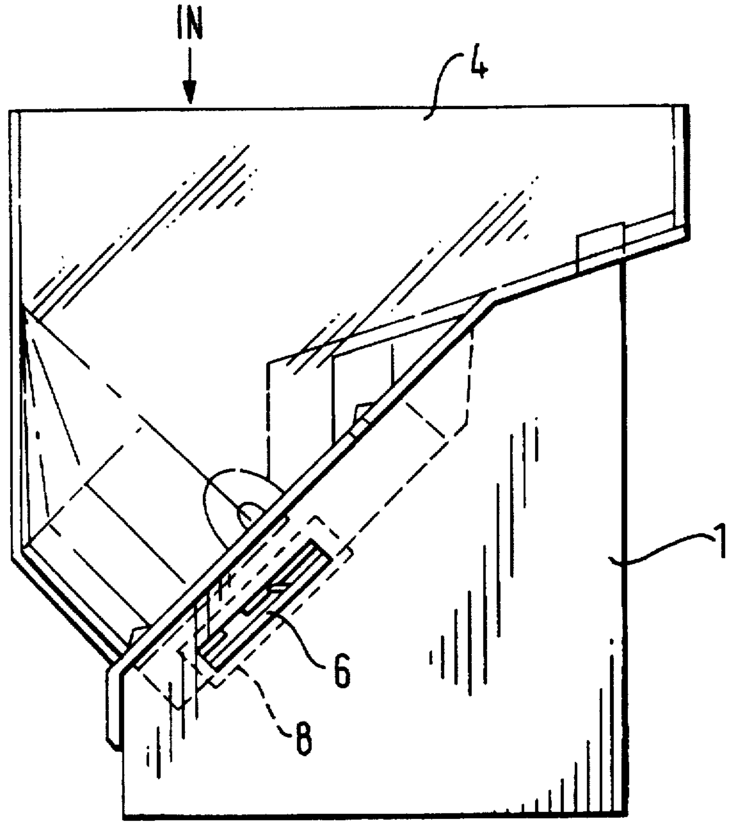
FIG. 1 is an elevational view of a coin hopper that includes an optical coin sensing station in accordance with the invention.
Figure 2:
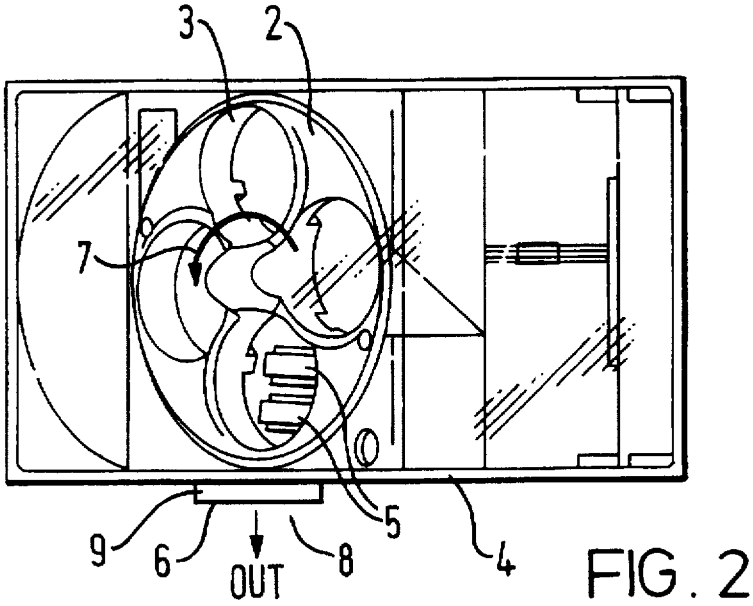
FIG. 2 is a top plan view of the coin hopper shown in FIG. 1.

Referring now to FIGS. 1 and 2, an optical sensing station in accordance with the invention is shown embodied in a coin hopper, which operates in accordance with the principles described in our EP-A-0 266 021. Briefly described, the coin hopper consists of a base part 1 which includes an electric motor (not shown) that rotates a paddle 2 which contains a plurality of apertures 3 that receive coins (not shown) which are fed from above into a transparent plastic hopper cover 4 in the direction of arrow IN. Columns of coins (not shown) build up in the apertures 3, and coins are ejected individually by means of spring loaded members through a coin outlet port 6 in the direction of arrow OUT, as the paddle 2 is rotated in the direction of arrow 7. A more detailed explanation of the manner of ejection of successive coins is given in EP-A-0 266 021 supra. The coin outlet port 6 is provided with an optical sensing station 8, the location of which is shown in dotted outline in FIG. 1 and is shown schematically in FIG. 2 on the exterior of the base 1, by way of illustration. However, the optical sensing station may be integrated into the base 1.

Referring now to FIGS. 3 to 10, the optical sensing station 8 includes a moulded housing 9 of plastics material that includes a slot 10 through which successive coins pass. The housing is affixed to the base part 1 by means of screws (not shown) which pass through apertures 11, 12 in the housing 9.

Figure 9:
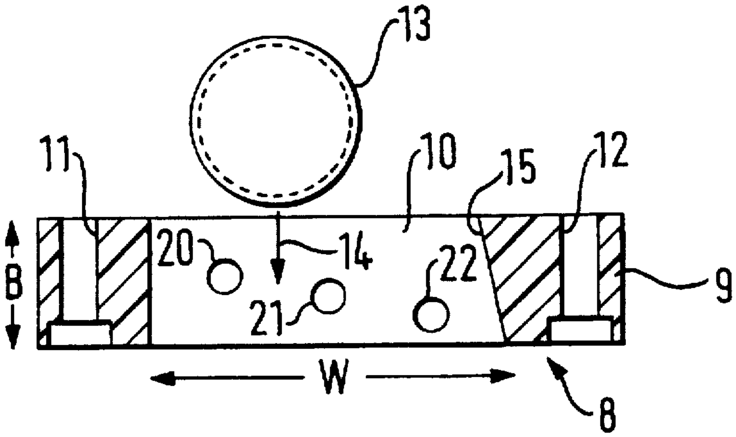
FIG. 9 is a sectional view along line C—C of FIG. 4.

As shown in FIG. 9, individual coins ejected from the apertures 3 in the paddle 2 (FIGS. 1 and 2) pass edgewise through the slot 10 and by way of illustration, coin 13 is shown passing in the direction of arrow 14 through the slot. The slot has a width dimension W and the slot has a tapered side wall 15 so that the width dimension increases in the direction of coin travel.

Figure 6:
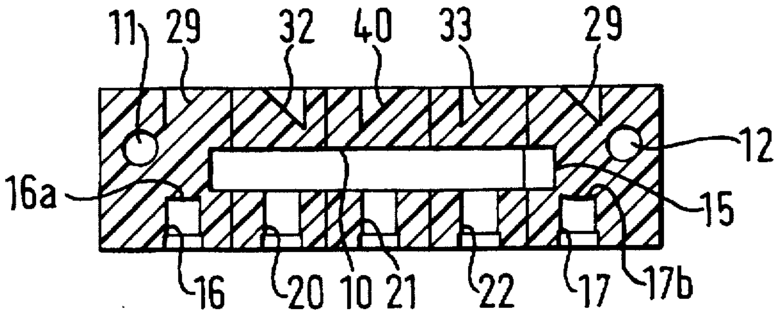
FIG. 6 is a sectional view of the housing taken along the line D—D of FIG. 5.
Figure 7:
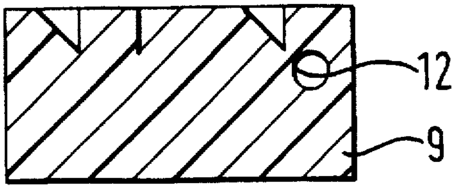
FIG. 7 is a sectional view taken along the line A—A of FIG. 3.
Figure 8:
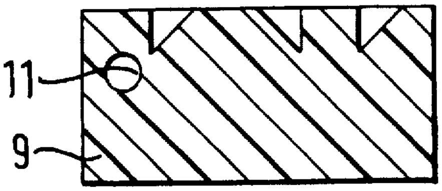
FIG. 8 is a sectional taken along the line B—B of FIG. 3.
Figure 10:
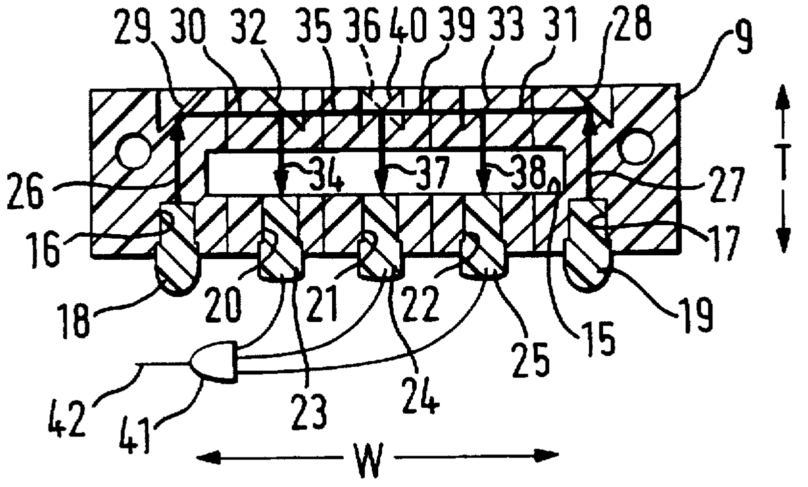
FIG. 10 is a schematic sectional view of the sensing station, showing two light emitting diodes and three photosensors installed in the housing of FIG. 3, various light paths being shown schematically.

As shown in FIGS. 3 to 6, the housing includes first and second receptacles 16, 17 on opposite sides of the slot in the width dimension thereof, which as shown in FIG. 10 receive first and second light sources in the form of light emitting diodes 18, 19. As shown in FIG. 6, the receptacles have curved end surfaces **16*a*, 17*a*, which act as lenses to collimate light from the light emitting diodes 18, 19**.

Figure 3:
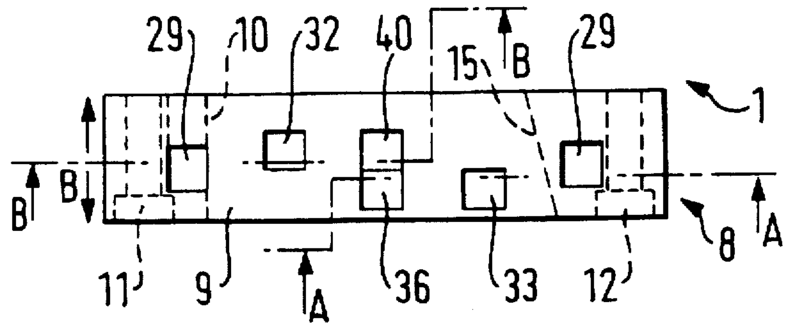
FIG. 3 is a top plan view of the optical sensing station housing shown schematically in FIG. 1.
Figure 4:
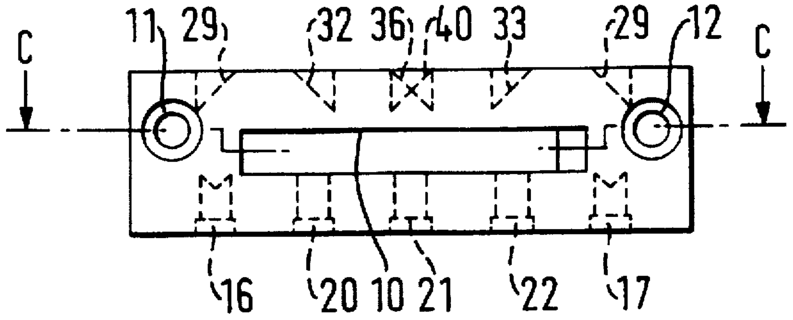
FIG. 4 is a front end view of the housing shown in FIG. 3.
Figure 5:
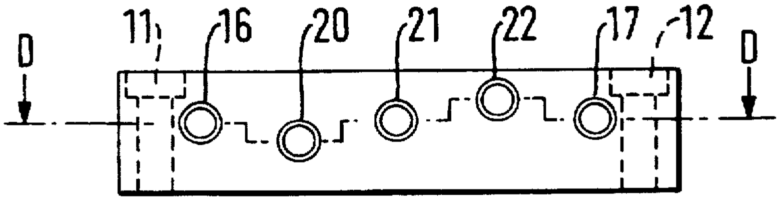
FIG. 5 is a bottom plan view the housing shown in FIG. 3.

Furthermore, as shown in FIG. 3 to 6, the housing includes first, second and third photosensor receptacles 20, 21, 22 which, as shown in FIG. 10 receive first second and third photosensors in the form of photodiodes 23, 24, 25. The first and second light sources 18, 19 produce first and second source beams 26, 27, on opposite sides of the slot 10, which are directed to respective reflectors 28, 29 that are integrally moulded in the material of the housing 9. The reflectors operate by a total internal reflection, so as to direct the first and second source beams 26, in the material of the housing 9 exteriorly of the slot 10, in the direction of the width dimension W, along paths 30, 31. The beams 30, 31 then encounter first and second beam splitting means in the form of reflective surfaces 32, 33 also integrally moulded in the housing 9. Referring to FIG. 3, the beams 30, 31 are broad in relation to the dimensions of the reflective surfaces 32, 33, so that only part of the light is reflected by the surfaces. Thus considering the surface 32, part of the beam 30 is reflected thereby, so as to form a first source beam 34 which traverses the slot 10 in the thickness direction T shown in FIG. 10. Also, part of the energy of the source beam 30 passes to one side of the reflective surface 32 to form beam 35, which then encounters a reflector 36, also integrally moulded in the housing 9. This surface reflects the beam 35 in the direction of arrow 37, so as to traverse the slot 10 and reach the second detector 24, thus forming a portion of a centrally disposed second sensing beam 37, which is spaced from the first beam 34 across the width W of the slot.

Light from the second source 19 is processed in a similar manner. The source beam 31 from the second source 19 encounters reflector 33 which reflects part of its energy in the direction of arrow 38 so as to form a third sensing beam that is directed to the third photosensor 25 at a position spaced from the first and second sensing beams 34, 37 in the width dimension W of the slot 10. A remaining portion of the energy of the source beam passes to one side of the reflective surface 33 so as to form beam 39 which encounters reflective surface 40 integrally moulded in the housing 9. The beam 39 is consequently reflected so as to form part of the second source beam 37 and is directed to the second sensor 24.

As shown in FIG. 3, the various surfaces, 29 to 32, 40, and 36, 33, 29 are staggered in the breadth dimension B of the housing so that for example, for the beam 30, part of the light is directed into the first sensing beam 34 (FIG. 10) and part is directed into the second sensing beam 37. By appropriately positioning and dimensioning the relative sizes of the reflectors and reflective surfaces, it is possible to arrange for the three photodetectors 23, 24, 25 all to receive substantially the same light intensity or in some other predetermined, desired intensity relationship. For the second beam 37, some of the light is derived from the first source 18 and some derived from the second source 19.

Thus, the first second and third sensing beams 34, 37, 38 FIG. 10) traverse the slot 10 at spaced apart positions along the width dimension thereof so that, referring to FIG. 9, when the coin 13 enters the slot it interrupts at least one of the sensing beams. Since the beams are positioned across the width of the slot, at east one of the beams will be interrupted by the coin 13. It will be seen that the interruption will occur for a range of coins of different diameter, varying from a coin corresponding to the full width of the slot to much smaller coins. In order to provide reliable detection, as shown in FIG. 10, the outputs of the photodetectors 23, 24, 25 are fed to an OR gate 41 which provides an output on line 42 whenever any single one of the sensing beams is interrupted by the passage of a coin through the slot.

Many modifications and variations of the optical sensing station are possible. For example, whilst the invention has been described in relation to a coin hopper, it could equally well be used as a post acceptance sensor in a coin validator in order to provide a positive indication that a coin has passed through the validator to the accept channel thereof. Also, the first and second beam splitting means 32, 33 shown in the described example could be formed in different ways, for example as semi-reflective surfaces rather than the partially reflective surfaces shown. Also, further sensing beams could be produced from either or both of the sources if enhanced resolution is required.

I claim:

1. An optical coin sensing station comprising:

means defining a passageway along which a coin can pass edgewise, with a width dimension to accommodate the coin's diameter and a thickness dimension to accommodate the coin's thickness;

a first source for providing a first source beam of optical radiation;

beam splitting means for providing first and second sensing beams from the source beam;

means for directing the sensing beams to traverse the passageway in the thickness dimension at spaced apart locations with respect to the width dimension;

first and second sensor means for respectively detecting the first and second sensing beams after having traversed the passageway, whereby the passage of at least one of the sensing beams to its respective sensor means is interrupted by the major surfaces of a coin passing along the passageway; and output means responsive to outputs from the sensor means to detect the presence of the coin.

2. A sensing station according to claim 1 wherein the passageway has width dimension to accommodate a given range of coin diameter, the first and second sensing beams traversing the passageway at different positions along the width dimension to permit the detection of coins of different diameter.

3. A sensing station according to claim 1 wherein the source is disposed to one side of the passageway with the source beam being directed exteriorly of the passageway in the direction of the width dimension, the beam splitting means comprising a reflective surface for reflecting a portion of the energy of the source beam so as to traverse the passageway as the first sensing beam, a portion of the energy of the source beam passing the reflective surface to form the second sensing beam, and a reflector for reflecting the second sensing beam so as to traverse the passageway.

4. A sensing station according to claim 3 wherein the second sensing beam traverses the passageway centrally of the width thereof.

5. A sensing station according to claim 3 including a second said optical source for providing a second source beam, second beam splitting means for forming third and fourth sensing beams from the second source beam, and means for causing the third and fourth beams to traverse the passageway at spaced apart locations.

6. A sensing station according to claim 5 including a third sensor means to receive the third sensing beam after having traversed the passageway.

7. A sensing station according to claim 6 wherein the second sensor means additionally receives the fourth sensing beam.

8. A sensing station according to claim 7 wherein the second optical source is disposed on the opposite side of the passageway to the first source with the source beam from the second source being directed exteriorly of the passageway in the direction of the width dimension and parallel to the source beam from the first source, and a further reflective surface is configured to reflect a portion of the energy of the second source beam so as to traverse the passageway as the third sensing beam, a portion of the energy of the second source beam passing said further reflective surface to form the fourth sensing beam, and a further reflector is configured for reflecting the fourth sensing beam so as to traverse the passageway to the second sensor.

9. A sensing station according to claim 3 including a housing formed of optically transparent material, the passageway including a slot in the housing through which coins pass edgewise, and receptacle means in the housing to receive the said optical source, whereby the said source beam is transmitted through the material of the housing.

10. A sensing station according to claim 9 wherein the or each said reflective surface and the or each said reflector comprises a respective surface integrally formed in the housing.

11. A sensing station according to claim 1 wherein the output means is operative to indicate the presence of a coin in the passageway when any one of the sensing beams is interrupted.

12. A coin hopper including a coin outlet port provided with a sensing station according to claim 1.

13. A coin validator provided with a coin acceptance sensor that comprises an optical sensing station as claimed in claim 1.

14. A sensing station according to claim 4 including a second said optical source for providing a second source beam, second beam splitting means for forming third and fourth sensing beams from the second source beam, and means for causing the third and fourth beams to traverse the passageway at spaced apart locations.

15. A sensing station according to claim 8 including a housing formed of optically transparent material, the passageway including a slot in the housing through which coins pass edgewise, and receptacle means in the housing to receive the said optical source, whereby the said source beam is transmitted through the material of the housing.

16. A coin validator with a coin acceptance sensor that comprises an optical sensing station as claimed in claim 8.

17. An optical coin sensor comprising:

mean defining a passageway for coins;

first and second light sources;

at least three photodetectors disposed across the width of the passageway, transversely of the direction of travel of coins therein and one side thereof; and reflective means on the other side of the passageway for directing light from the sources to cross the passageway to the photodetectors, whereby a coin travelling along the path interrupts the passage of light to at least one of the detectors; the arrangement being such that at least one of the photodetectors receives light from both of the sources, in the absence of a coin.

* * * * *